(12) United States Patent
Van Boekhout

(10) Patent No.: US 8,040,239 B2
(45) Date of Patent: Oct. 18, 2011

(54) LIGHTING CONTROL SYSTEM

(75) Inventor: Franciscus Laurentius Van Boekhout, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 429 days.

(21) Appl. No.: 12/162,364

(22) PCT Filed: Jan. 25, 2007

(86) PCT No.: PCT/IB2007/050259
§ 371 (c)(1),
(2), (4) Date: Jul. 28, 2008

(87) PCT Pub. No.: WO2007/086018
PCT Pub. Date: Aug. 2, 2007

(65) Prior Publication Data
US 2009/0001892 A1    Jan. 1, 2009

(30) Foreign Application Priority Data
Jan. 30, 2006   (EP) .................................... 06101035

(51) Int. Cl.
*G08B 1/08*   (2006.01)
(52) U.S. Cl. ......... 340/539.22; 340/539.23; 340/539.26; 340/539.3; 340/555
(58) Field of Classification Search .................. 340/539, 340/539.26, 539.23, 539.22, 539.1, 539.19, 340/539.17, 539.16, 541, 540, 545.3; 315/149–159, 315/291, 297, 307–326
See application file for complete search history.

(56) References Cited

U.S. PATENT DOCUMENTS

| | | | |
|---|---|---|---|
| 5,455,487 A | 10/1995 | Mix et al. | |
| 7,369,060 B2 * | 5/2008 | Veskovic et al. | 340/825.36 |
| 7,619,539 B2 * | 11/2009 | Veskovic et al. | 340/825.22 |
| 2004/0208200 A1 * | 10/2004 | Hejdeman et al. | 370/476 |
| 2005/0162101 A1 | 7/2005 | Leong et al. | |
| 2005/0174067 A1 | 8/2005 | Huber et al. | |

FOREIGN PATENT DOCUMENTS

| | | |
|---|---|---|
| WO | 02082618 A1 | 10/2002 |
| WO | 03017733 A1 | 2/2003 |
| WO | 2004049767 A1 | 6/2004 |
| WO | 2005069698 A1 | 7/2005 |

OTHER PUBLICATIONS

S. Luger, et al: Beleuchtung Wird Busfähig, Ein Asie macht's möglich: Digital Gesteuertes, 2087 Elektronik, vol. 41, No. 26, Dec. 22, 1992, pp. 26-30.

* cited by examiner

*Primary Examiner* — Tuyet Thi Vo

(57) ABSTRACT

A lighting control system (1) comprises: a communication bus (2); at least one extension movement detector (30) issuing detection pulses (DOS) over said communication bus in response to detecting a movement, at first time intervals (T1) determined by a sensor timer (34); one master luminaire (10) comprising a lamp (11) and a master controller (13) issuing master command signals (MCS) over said bus in response to detection pulses (DOS) received over said bus; and at least one slave luminaire (20) comprising a lamp (21) and a slave controller (23) being responsive to the master control signals (MCS) received over said bus to switch the corresponding lamp ON and OFF. Whenever the master controller receives a detection pulse, it starts a master timer (15) and switches the lamps ON. If the master timer times out (T2) without the master controller receiving any detection pulses, the master controller switches the lamps OFF.

5 Claims, 6 Drawing Sheets

LIGHTING CONTROL SYSTEM

FIELD OF THE INVENTION

The present invention relates in general to a lighting control system.

BACKGROUND OF THE INVENTION

Conventionally, for illuminating a room or the like, a lamp is connected to the electric mains through a switch, to be operated by a user. When a user enters a room, he switches on the light, and when he leaves the room, he switches off the light. If a room has multiple lights, the room typically has multiple switches, each switch servicing one or more lamps.

Instead of user-operable switches, also automatic switches exist, which have a built-in detector, and which switch ON or OFF depending on a detected event. For instance, light detectors switch ON automatically when it starts getting dark, and switch OFF when it starts getting lighter again. Movement detectors switch ON automatically when a movement is detected, and switch OFF when no movement has been detected for a predefined time period.

Such switches, be it user-operable or automatic, switch the mains power. Such switch can be integrated with a lamp fitting or lamp housing, or even with a light bulb itself, in which case a switch is a dedicated switch for switching one specific lamp. Such switch can also be a separate device having a switched power output, to which one or more remote lamps can be connected. In that case it is possible to detect movement in one location and switch ON the light at a distance. A disadvantage is, however, that separate power lines must be arranged from the switch to the corresponding lamps.

In the following, the word "lamp" will be used for the actual light-generating element, such as a light bulb, a fluorescent tube, etc. A lamp will be mounted in a fitting, which is arranged in a housing, possibly comprising a ballast, the housing further in general being provided with mounting means for mounting against a wall or in a ceiling; such combination will in the following be indicated by the word "luminaire".

More recently, a system has been developed comprising multiple luminaires and a communication bus to which all luminaires are connected. One luminaire comprises an integrated movement sensor; this luminaire will be indicated as a MASTER luminaires The other luminaires do not have such sensor; these luminaires will be indicated as a SLAVE luminaire. All luminaires are connected directly to the mains. Each luminaire comprises a controllable switch, controlled by a controller that is coupled to the communication bus. The controller of the MASTER luminaire is also coupled to the integrated movement sensor. If the sensor detects a movement, the MASTER controller controls its own switch to go ON, but it also sends a digital command signal over the communication bus to the SLAVE luminaires. A SLAVE controller controls its corresponding switch in response to commands received from the MASTER controller over the communication bus. Thus, it is possible to illuminate a relatively large area (for instance an entire room) in response to detection of movement in one small region (for instance the entrance door).

In some situations, it may be that the detection zone of the movement sensor is too limited, so that it is desirable to enlarge the detection zone. For example, a room may have two or more entrances. For such situation, it would be possible to arrange a second MASTER luminaire for defining a second detection zone. A problem then would be that two (or more) masters are connected to one and the same bus, and their respective command signals may collide with each other. In order to prevent this, multi-master systems usually use a complicated communication protocol.

Another practical problem may be that no mains power line is available at the location where it is desired to add a detection zone. For such situation, it would be desirable to have available a separate, auxiliary movement detector which can be battery-powered. In order to provide long battery life, the energy consumption should be kept to a minimum. On the other hand, the auxiliary movement detector should be operational 24 hours each day.

The present invention aims to solve the above problems.

SUMMARY OF THE INVENTION

According to an important aspect of the present invention, a separate, auxiliary movement detector is operating in a monitoring mode most of the time, in which no sensor output signals are generated so that practically no energy is consumed. As long as no movement is detected, the detector remains in its monitoring mode. Only when a movement is detected, the detector turns to a command mode. In regular time intervals, the detector generates a brief output signal; thus, the power consumption remains small. As long as the detector continues to detect movement, the detector remains in its command mode. Only when no movement is detected for a pre-defined time interval, the detector returns to its monitoring mode.

In view of the fact that the detector output signal is only brief, and is outputted at relatively large time intervals, the power consumption is minimal, and the typical lifetime of a battery can be in the order of five years.

The detector output signal is sent over the communication bus, and is thus received by each SLAVE controller and by the master controller. The signal is ignored by the SLAVE controllers and processed by the MASTER controller only, which in turn generates a control output signal for the SLAVE controllers, as usual. Thus, effectively, the auxiliary detector is functioning as remote detector of the master.

BRIEF DESCRIPTION OF THE DRAWINGS

These and other aspects, features and advantages of the present invention will be further explained by the following description of a preferred embodiment with reference to the drawings, in which same reference numerals indicate same or similar parts, and in which.

DETAILED DESCRIPTION OF THE INVENTION

Figure 1:
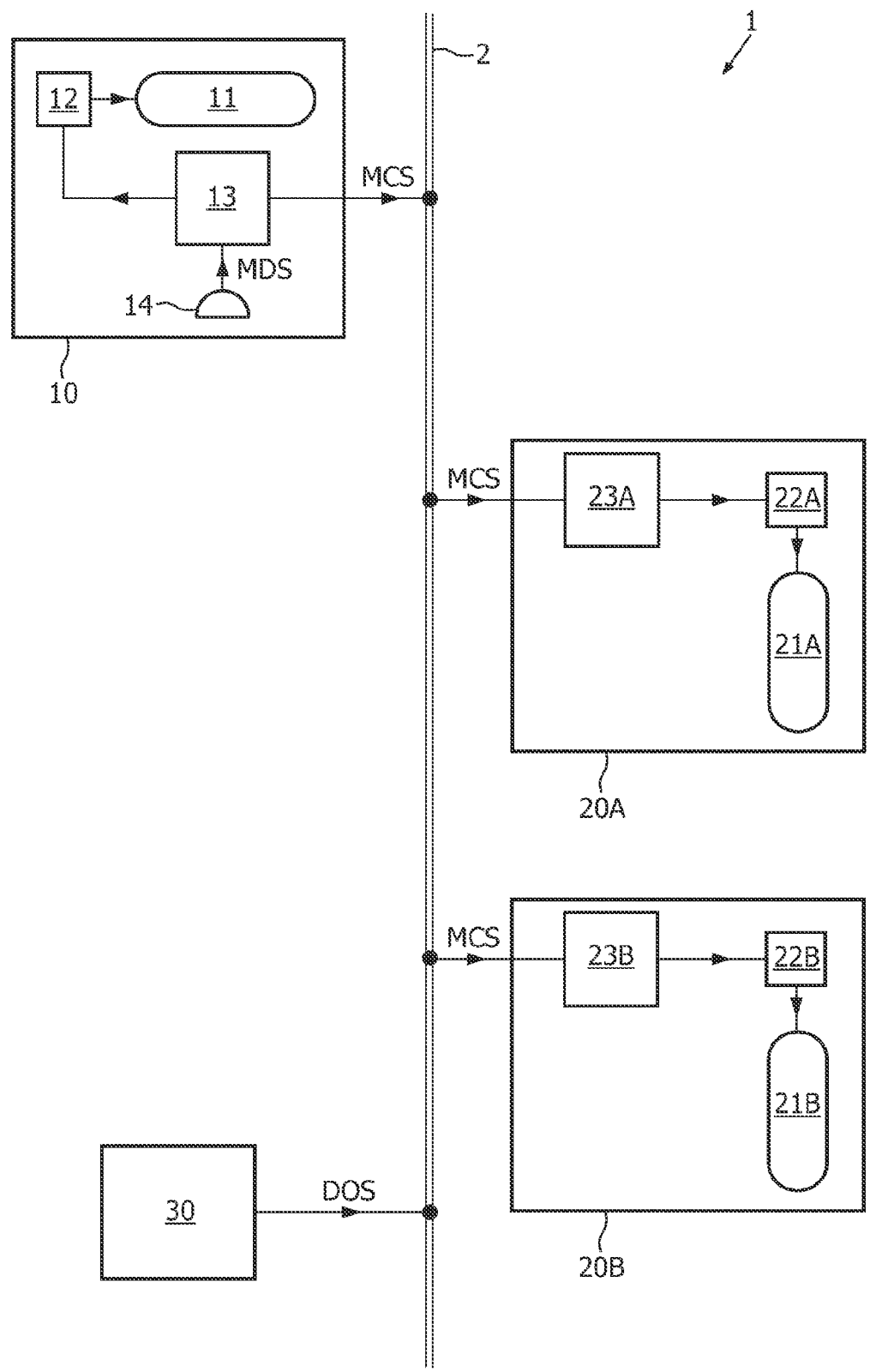
FIG. 1 schematically illustrates an illumination system.

FIG. 1 schematically illustrates an illumination system 1, comprising one master luminaire 10 and a plurality of slave luminaires 20, coupled to a communication bus 2. In FIG. 1, two such slave luminaires 20 are shown, distinguished by addition of letters A and B to the corresponding reference numerals.

The master luminaire 10 comprises a lamp 11 and a lamp operation controller 12, such as a ballast or a switch. The master luminaire 10 further comprises a master controller 13 and a movement sensor 14. The movement sensor 14 is capable of detecting a movement in a detection zone (not shown), and generates a movement detection signal MDS for the master controller 13. The master controller 13 controls the operational mode of the lamp 11 (i.e. ON or OFF) in response to the movement detection signal MDS. It is possible that the master controller 13 and the lamp operation controller 12 are integrated as one unit.

Likewise, each slave luminaire 20 comprises a lamp 21 and a lamp operation controller 22, such as a ballast or a switch. The slave luminaire 20 further comprises a slave controller 23 for controlling the operational mode of the lamp 21 (i.e. ON or OFF). It is possible that the slave controller 23 and the lamp operation controller 22 are integrated as one unit. It is also possible that a lamp operation controller 22 has an identical design as the master lamp operation controller 12.

The master controller 13 and the slave controllers 23 are connected to the communication bus 2. The master controller 13 is designed to output a master control signal MCS to the communication bus 2, and the slave controllers 23 are designed to receive the master control signal MCS and to control the operational mode of the lamp 21 in response to the master control signal MCS received, such that the operational mode of the slave lamps 21 will always be the same as the operational mode of the master lamp 11.

According to an important aspect of the present invention, the illumination system 1 further comprises a separate detector device 30, hereinafter indicated as extension detector, having an output coupled to the communication bus 2, outputting a detector output signal DOS to the communication bus 2. The extension detector 30 comprises a sensor sensitive to the presence of a person in general. For instance, the detector 30 may comprise a sensor sensitive to moving bodies, or to approaching bodies. Its detection principle may be based on the reflection of ultra-sonic pulses, or on active or passive infrared detection. Since such sensors are known per se, a further discussion on the design and detection operation of the detector 30 is not necessary here.

Only the master controller 13 is responsive to the detector output signal DOS; the slave controllers 23 are only responsive to the master control signal MCS.

The operation of the system is such that all lamps are switched on as soon as the movement sensor 14 or the extension detector 30 detects a movement, and are switched off if no movement is detected during some time, as dictated by the master. Further, the operation of the extension detector 30 is such that it consumes little power yet has a quick response time to the detection of movement.

Figure 2:
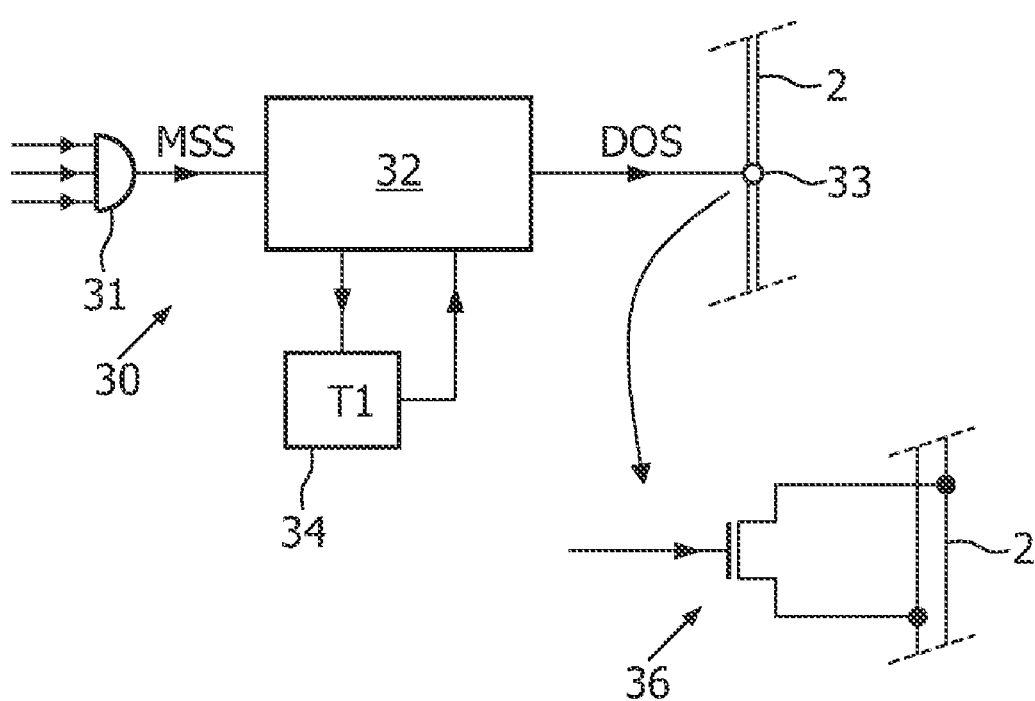
FIG. 2 is a block diagram schematically illustrating an extension detector.

FIG. 2 is a block diagram schematically illustrating the main components of an embodiment of the extension detector 30. An actual movement sensor 31, preferably a passive sensor such as a passive infrared sensor, generates a movement sensor signal MSS indicating whether a movement is detected. A sensor controller 32 receives the movement sensor signal MSS, and is designed to generate the detector output signal DOS at an output 33. A sensor timer 34 is associated with the sensor controller 32.

Figure 3:
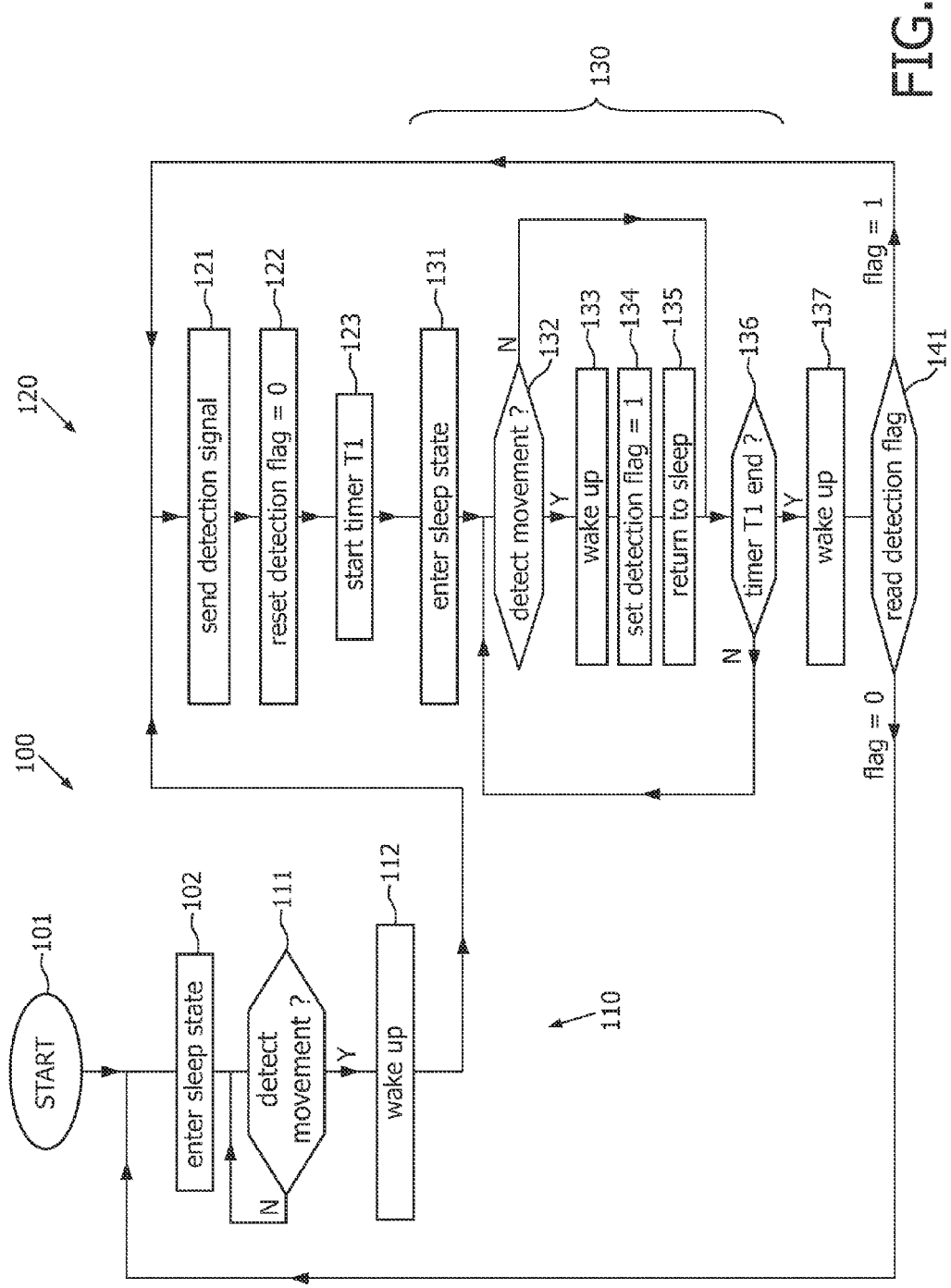
FIG. 3 is a flow diagram schematically illustrating an operation of the extension detector.

FIG. 3 is a flow diagram schematically illustrating an exemplary operation 100 of the extension detector 30 of FIG. 2.

The controller 32 of the extension detector 30 can operate in two modes 110, 120. A first mode 110 will be indicated as inactive mode or monitor mode, a second mode 120 will be indicated as active mode or command mode.

In FIG. 3 it is assumed that the controller 32, after a start, a reset, or an initial power-up [step 101] enters the monitor mode 110. Although not essential, it is preferred that, initially, the controller 32 is in a sleep state or power-down state [step 102], in which state the controller 32 consumes little or no energy. In this state, the controller 32 is responsive to the movement sensor signal MSS. As long as there is no movement sensor signal MSS received, or a possibly received signal is not indicative of a sensed movement, the controller 32 remains in the sleep state. Thus, in effect, the controller 32 is continuously monitoring the movement sensor signal MSS, and remains in the monitor mode 110 as long as it detects no movement. It is important to note that the controller 32 does not issue any detector output signal while operating in the monitor mode 110. Since the monitoring operation costs little or no energy, the extension detector 30 consumes virtually no power while operating in the monitor mode 110, especially when operating in the sleep state.

If the controller 32 receives the movement sensor signal MSS indicating a sensed movement, it wakes up [step 112] and makes a transition to the command mode 120. It sends a brief detector output signal DOS [step 121], as will be explained later, and it resets a detection flag to zero [step 122], indicating that no movement has been detected yet (after the initial detection that triggered the command mode).

In step 123, the controller 32 starts the sensor timer 34. The sensor timer times a predefined time period T1, for instance five minutes. The timer 34 may be implemented as a countdown timer, starting at a positive preset value which is decreased by one at a predefined clock interval, for instance 1 ms, thus counting down to zero, but it is also possible that the timer 34 is implemented as a count-up timer, starting at a counter value zero which is incremented by one at a predefined clock interval, thus counting up till a predefined timer value. Since such timer implementation principles are commonly known and can be used as desired, the further details of the timer operation are omitted here.

Then, the controller 32 enters a waiting loop 130. Preferably, the controller 32 returns to the sleep state [step 131]. The controller 32 awakes from the sleep state only on detection of a movement or on expiry of the timer period T1. As long as there is no movement sensor signal MSS received, or a possibly received signal is not indicative of a sensed movement, and as long as the timer is running, the controller 32 remains in the sleep state. In this state, the controller 32 does not issue any detector output signal, so the extension detector 30 consumes virtually no power.

If [step 132] the controller 32 receives the movement sensor signal MSS indicating a sensed movement, it wakes up [step 133], sets the detection flag to one [step 134], indicating that a movement has been detected, and returns to the sleep state [step 135]. As long as there is no movement sensor signal MSS received, these steps are not performed so that the value of the detection flag remains unchanged.

If [step 136] the controller 32 receives a timer signal indicating that the timer period Ti has passed, it wakes up [step 137] and leaves the waiting loop to continue to step 141. As long as the timer is running, the controller 32 remains in the sleep state [return to step 132].

In step 141, the controller 32 reads the detection flag. If the detection flag has value zero, indicating that no movement has been detected during the waiting period T1, the controller 32 jumps back to step 102 to return to the monitor mode 110. If, in contrast, the detection flag has value one, indicating that a movement has been detected at least once during the waiting period T1, the controller 32 jumps back to step 121 to again send a brief detector output signal DOS, and remains in the command mode 120 to repeat the above cycle of waiting loop 130.

In the above example, the controller 32 wakes up on each detected movement and on expiry of the timer period T1. This allows the controller for instance to count the number of movement events detected. However, in the embodiment discussed, number of movement events detected during the timer period makes no difference, while the steps of awaking, performing an action, and going back to sleep again consume some energy. Preferably, this energy consumption is avoided. Therefore, in a preferred alternative embodiment, the controller 32 is designed such that a set detection flag inhibits the responsiveness to the movement sensor signal MSS. Then, the controller 32 wakes up on the first detected movement only (and also on expiry of the timer period T1).

Figure 4:
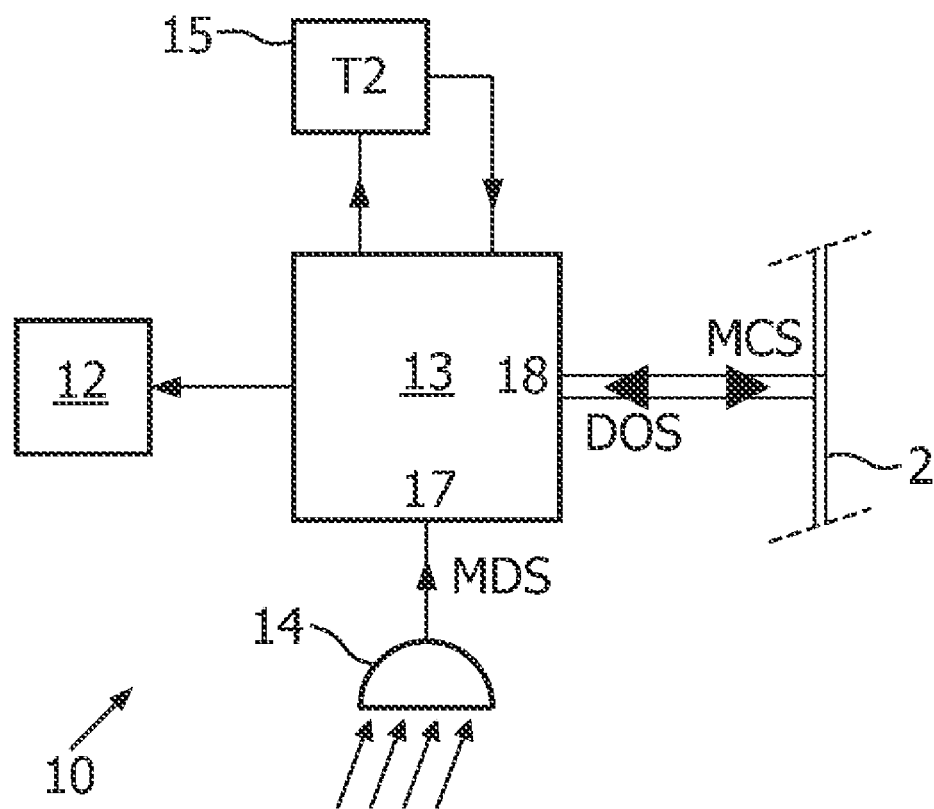
FIG. 4 is a block diagram schematically illustrating a master controller.

FIG. 4 is a block diagram comparable to FIG. 2, schematically illustrating the main components of an embodiment of the master luminaire 10. The master controller 13 receives the movement detector signal MDS from its corresponding movement sensor 14 at a first input 17. Further, the master controller 13 has a combined input/output terminal 18 connected to the communication bus 2. As an input, terminal 18 receives the detector output signal DOS from extension detector 30. The master controller 13 is designed to generate its master control signal MCS at its output terminal 18 on the basis of the received input signals MDS and DOS. A master timer 15 is associated with the master controller 13.

Figure 5:
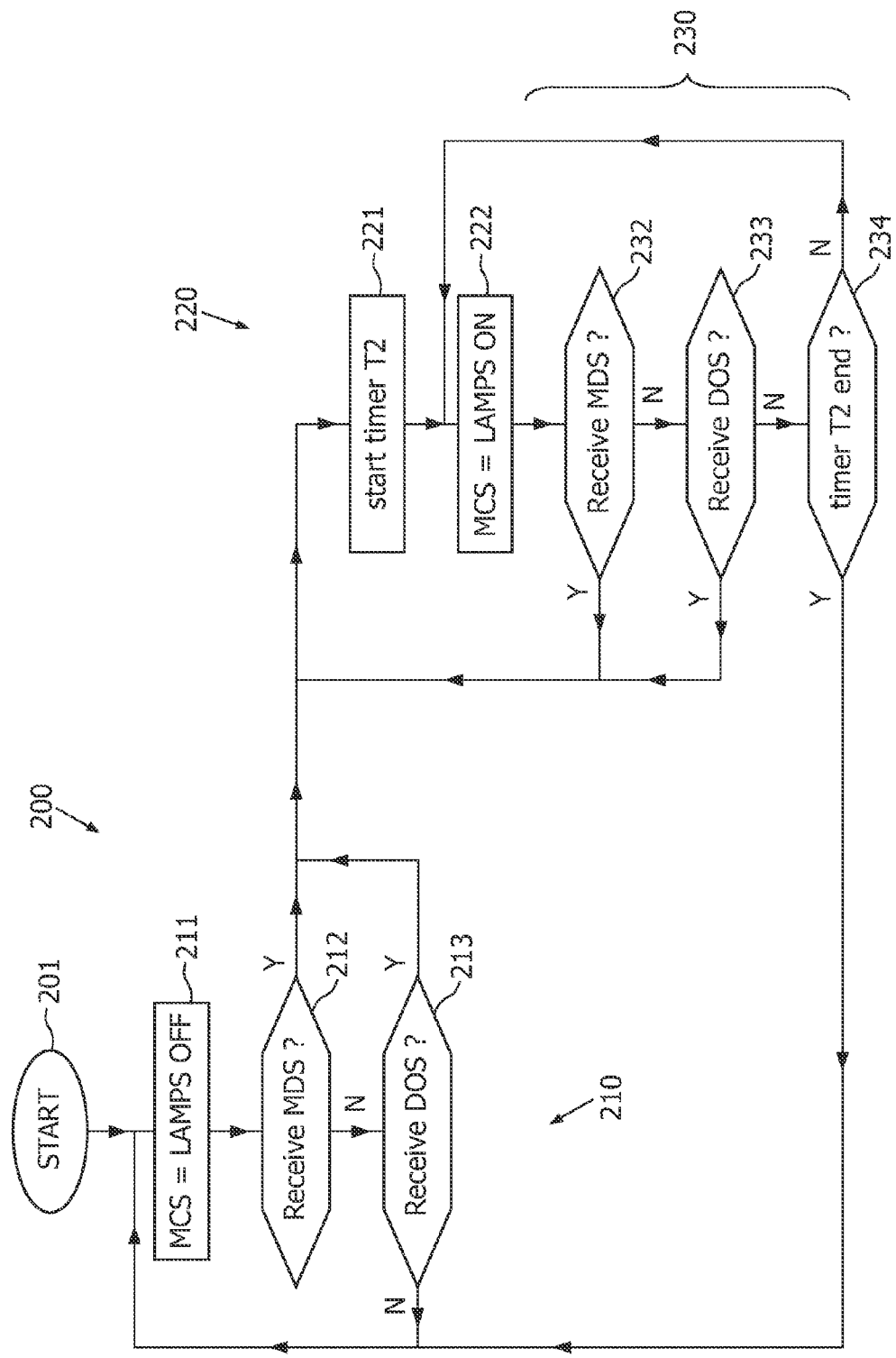
FIG. 5 is a flow diagram schematically illustrating an operation of the master controller.

FIG. 5 is a flow diagram schematically illustrating an exemplary operation 200 of the master controller 13 of FIG. 4.

The master controller 13 can operate in two modes 210, 220. A first mode 210 will be indicated as OFF mode, a second mode 220 will be indicated as ON mode.

In FIG. 5 it is assumed that the master controller 13, after a start, a reset, or an initial power-up [step 201] enters the OFF mode 210, in which it generates the master control signal MCS such that the lamps are OFF [step 211]. In step 212, the master controller 13 checks the movement detector signal MDS received at its first input 17 to see if it indicates a detected movement. If not, the master controller 13 checks [step 213] the detector output signal DOS received at its second input 18 to see if the extension detector 30 has detected a movement. If not, the master controller 13 returns to step 211. Thus, the master controller 13 is continuously monitoring the detector signals MDS and DOS, and remains in the OFF mode as long as no movement is detected.

The order of steps 212 and 213 may be reversed.

If, in step 212 or 213, the master controller 13 finds that the movement detector signal MDS or the detector output signal DOS indicates a detected movement, it makes a transition to the ON mode 220, in which it generates the master control signal MCS such that the lamps are ON [step 222]. Then, it enters a hold loop 230 during which it holds the ON condition.

On entry of the ON mode, in step 221, the master controller 13 starts the master timer 15. This timer times a second predefined time period T2, which preferably is longer than the first predefined time period T1; for instance, the second predefined time period T2 may be ten minutes. As mentioned in respect of the first timer 34, the master timer 15 may be implemented as a count-down timer or as a count-up timer.

In step 232, similar to step 212, the master controller 13 checks the movement detector signal MDS received at its first input 17 to see if it indicates a detected movement. If not, the master controller 13 checks [step 233, similar to step 213] the detector output signal DOS received at its second input 18 to see if the extension detector 30 has detected a movement. If not, the master controller 13 checks the master timer 15 value [step 234] to see whether the second timer period T2 has passed. If not, the master controller 13 jumps back to step 222. Thus, the master controller 13 is continuously monitoring the detector signals MDS and DOS, and remains in the ON mode with the master timer 15 running as long as no movement is detected.

Again, the order of steps 232 and 233 may be reversed.

If, in step 232 or 233, the master controller 13 finds that the movement detector signal MDS or the detector output signal DOS indicates a detected movement, it jumps back to step 221 to restart the master timer 15. Thus, the second time period T2 starts running again.

If, in step 234, the master controller 13 finds that the second timer period T2 has passed, indicating that no movement has been detected for the complete duration of T2, the master controller 13 jumps back to step 211 to return to the OFF mode.

Figure 6:
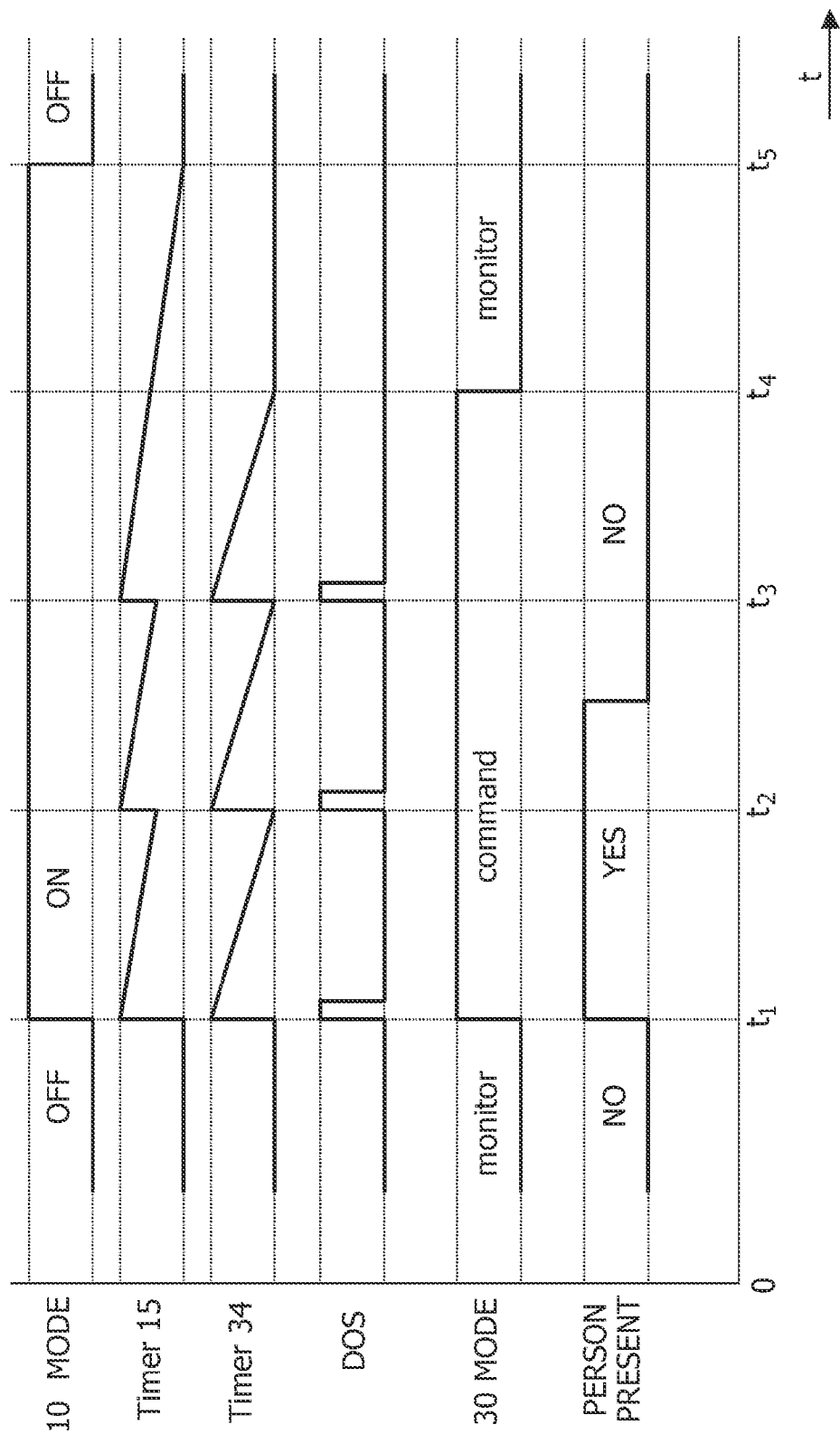
FIG. 6 is a timing diagram schematically illustrating an operation of the illumination system.

FIG. 6 is a timing diagram, illustrating the operation of the system 1 as a whole. The horizontal axis represents time. Assume that at time t=0 the system is at rest. All lamps are OFF (master controller 13 is in its OFF mode 210), and the extension detector 30 is in its monitor mode 110.

At a certain time t1, a person enters the area covered by the extension detector 30, which immediately makes a transition to its command mode 120: it sets its timer 34 (T1), and it sends its output signal DOS. This is received by the master controller 13, which in response immediately makes a transition to its ON mode: all lamps are switched ON, and it sets its timer 15 (T2).

At time t2=t1+T1, the extension detector 30 again sends its output signal DOS. In response, the master controller 13 resets its timer 15 (T2).

A short time later, the person leaves the area.

At time t3=t2+T1, the extension detector 30 again sends its output signal DOS, on account of the fact that the presence of the person has been detected between t2 and t3. In response, the master controller 13 resets its timer 15.

At time t4=t3+T1, the extension detector 30 finds that no presence has been detected during the time interval from t3 to t4, and returns to its monitor mode 110 without sending the output signal DOS.

At time t5=t3+T2, the timer 15 of the master controller 13 times out; in response, the master controller 13 returns to its OFF mode, sending its master control signal MCS to switch off all lamps.

If, at a time later than t5, a person enters the area, the above is repeated. If, at a time between t4 and t5, a person enters the area, the extension detector 30 immediately makes a transition to its command mode 120 and sends its output signal DOS again, in response to which the master controller 13 resets its timer 15, so that the lamps remain ON.

The above-explained principles of the present invention can be applied irrespective of the nature of the communication bus 2. Particularly, this may be a wired bus, or a wireless bus. Further, the communication from sensor 14 to controller 13 may be wired or wireless, the communication from sensor 31 to controller 32 may be wired or wireless, the communication from controller 32 to the communication bus 2 may be wired or wireless, and the communication between controller 13 and communication bus 2 may be wired or wireless.

Further, the above explained principles of the present invention can be applied irrespective of the nature of the master control signal MCS and the detector output signal DOS, as long as these two signals are easily distinguishable. In a particularly preferred embodiment, the communication bus 2 is a wired bus comprising two wires, and the master control signal MCS consists of a particular DC voltage level of one wire with respect to the other in the ON state and a different DC voltage level (preferably zero) in the OFF state. The slave controllers 23 are designed to be responsive to DC voltage levels only. In such case, the detector output signal DOS may conveniently consist of a brief short-circuiting of the bus lines, for which purpose the extension detector 30 may comprise a controllable switch 36, as illustrated in the detail of FIG. 2. The slave controllers 23 are designed to ignore such brief short-circuiting of the bus lines.

A suitable value for the duration of the detector output signal DOS is for instance 10 ms. Shorter durations are also possible, but the master controller should be able to clearly distinguish between error signals and actual detector output signals; thus, it is preferred that the duration of the detector output signal DOS is longer than 1 ms. Longer durations than 10 ms are also possible, but not necessary, and lead to increased power consumption.

The value of the first timer duration T1 can in principle be selected as desired within a rather large range. The longer the duration of T1, the less power will be consumed. As can be seen from FIG. 6, the first timer duration T1 adds to the switch off delay T2 of the master controller 13 to determine the actual time which laps between a person leaving the area and the lights switching off, so T1 should not be selected too long. A suitable value is in the range of 1 to 10 minutes.

It should be clear to a person skilled in the art that the present invention is not limited to the exemplary embodiments discussed above, but that several variations and modifications are possible within the protective scope of the invention as defined in the appending claims.

For instance, it is possible to couple two or more extension detectors 30 to the communication bus 2. Each individual extension detector operates as explained above, without interfering with the other extension detectors. The master controller 13 operates as explained above, it being irrelevant which detector issues a detector output signal DOS or whether multiple detector output signal are received within a time interval T1: after all, the only effect of a detector output signal DOS is the master controller 13 resetting its associated timer T2.

Further, for implementing the present invention, it is not necessary that the master luminaire 10 is provided with its own movement sensor 14. In a possible embodiment of the system, the master luminaire 10 is operating with remote detectors only. If the master luminaire 10 is provided with its own movement sensor 14, its response to the detector signals MDS received internally from this movement sensor 14 is identical to its response to the detector signals DOS received over the communication bus.

Further, for implementing the present invention, it is even not necessary that the master luminaire 10 is provided with its own lamp 11 and lamp switch 12. In the context of the present invention, it is only relevant that the master device operates as a spider in a web, being responsive to detector signals on the communication bus sent from remote detectors, and operative to send control signals over the communication bus to remote slave luminaires.

In the above, the present invention has been explained for an example where the master control signal MCS is a DC level. It is also possible that the master control signal MCS is a digital signal in accordance with a predefined protocol. The protocol contains requirements for the number of bits, duration and magnitude of pulses, etc. The slave controllers ignore signals which are not in conformity with this protocol. Thus, the detector output signal DOS may also be a digital signal, not being in conformity with said protocol. The master controller is designed to understand the protocol used for the detector output signal DOS. Thus, the detector output signal DOS may contain digitally coded information, and actions by the master controller may depend on the contents of this information.

It is noted that a DC level may be continuously present on the communication bus, but a digitally coded pulse signal is always repeated at a certain repeat frequency, in which case the slave controllers are designed to maintain the switch state ON or OFF as between consecutive command signals MCS.

In the above, the invention is specifically explained for the detection of movement. However, sensors such as passive infrared detectors or the like may detect the presence of a human body even if it is standing or sitting still. Thus, the present invention relates in general to "presence detectors", and a detected presence will be indicated as a detected event.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Master luminaire suitable for use in a lighting control system, the luminaire comprising:
    a master controller, a master timer associated with the master controller, and a lamp and a lamp operation controller controlled by the master controller;
    wherein the master controller has an output for generating a master command signal for a communication bus;
    wherein the master controller has an input for receiving a detection signal from an extension detector that is separate and remote from said master controller;
    wherein the master controller is capable of operating in an OFF mode or in an ON mode;
    wherein the master controller, when operating in its OFF mode, is designed to continuously or repeatedly generate the master command signal having a first value for keeping lamps switched OFF, to continuously monitor its input to check for the receipt of a detection signal from the extension detector, to continue operating in the OFF mode as long as the detection signal is not received, and to make a transition to the ON mode as soon as the detection signal is received;
    wherein the master controller, when operating in its ON mode, is designed to continuously or repeatedly generate the master command signal having a second value for keeping lamps switched ON, to continuously monitor the input to check for the receipt of the detection signal from the extension detector, and to make a transition to the OFF mode if, after having received a previous of the detection signal, no new of the detection signal is received during a time interval determined by said master timer.

2. Master luminaire according to claim 1, wherein said output and said input are a common input/output for connection to the communication bus.

3. Master luminaire according to claim 1, wherein the master controller, when entering its ON mode, is designed to start the master timer.

4. Master luminaire according to claim 1, wherein the master controller, when operating in its ON mode, is designed to reset the master timer in response to receiving a detection signal.

5. Master luminaire according to claim 1, wherein the master controller, when operating in its ON mode, at the end of the time interval determined by said master timer, is designed to return to its OFF mode.

* * * * *